United States Patent [19]

Klimek

[11] 4,058,345
[45] Nov. 15, 1977

[54] BRAKE APPARATUS INCLUDING CONTROL VALVE WITH INTEGRAL CHECK VALVE

[75] Inventor: Boleslaw M. Klimek, Des Plaines, Ill.

[73] Assignee: The Echlin Manufacturing Company, Branford, Conn.

[21] Appl. No.: 660,492

[22] Filed: Feb. 23, 1976

[51] Int. Cl.² .............................................. B60T 13/38
[52] U.S. Cl. ...................................... 303/6 M; 303/7; 303/50; 303/71; 303/84 A
[58] Field of Search ...................... 303/7, 9, 13, 50, 56, 303/54, 71, 6 R, 84, 52, 28, 6 M, 29, 6 A, 30; 188/3, 170; 137/627.5

[56] References Cited
U.S. PATENT DOCUMENTS

| 3,096,789 | 7/1963 | Horowitz et al. | 303/28 X |
| 3,109,442 | 11/1963 | Horowitz | 303/29 X |
| 3,790,222 | 2/1974 | Fannin | 303/9 |
| 3,841,714 | 10/1974 | Schultz | 303/9 X |
| 3,862,782 | 1/1975 | Horowitz et al. | 303/30 X |

Primary Examiner—Trygve M. Blix
Assistant Examiner—Douglas C. Butler
Attorney, Agent, or Firm—Neuman, Williams, Anderson & Olson

[57] ABSTRACT

A valve for controlling the operation of spring brake chambers in spring brake actuators used in tractor-trailer combinations. The valve is adapted for use with two spring brake actuators and two sources of supply pressure and includes an integral check valve for permitting fluid to flow from either source into the valve but from neither source into the other source. The valve further includes apparatus for alternately providing communication between output port(s) to the spring brake actuators and the check valve or an exhaust port.

5 Claims, 5 Drawing Figures

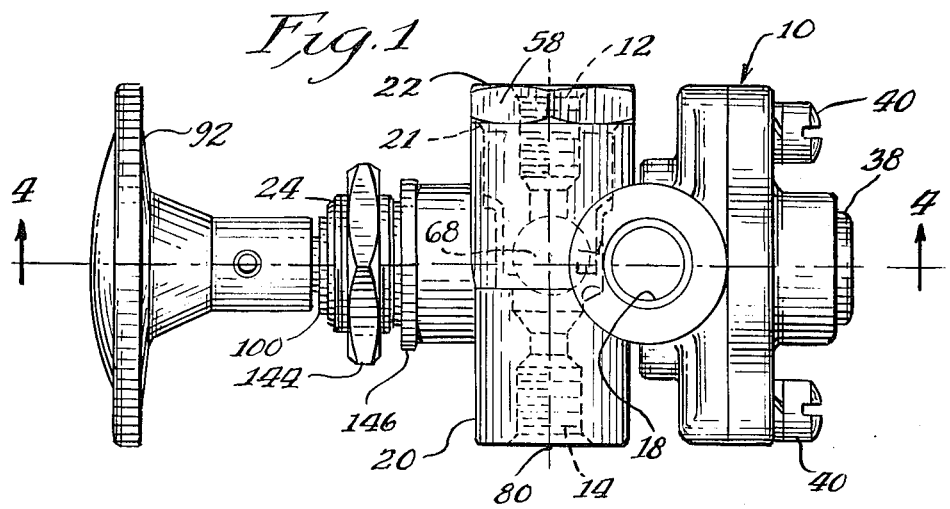
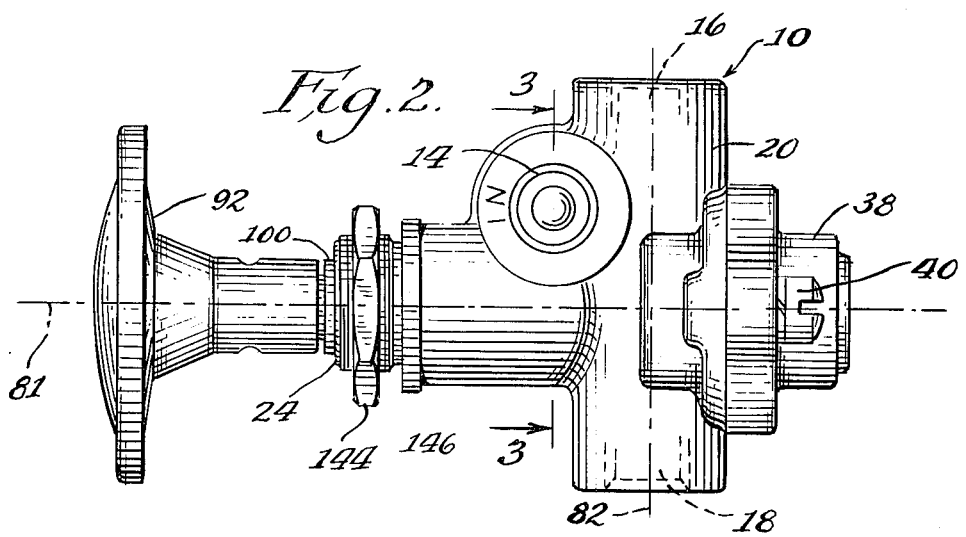
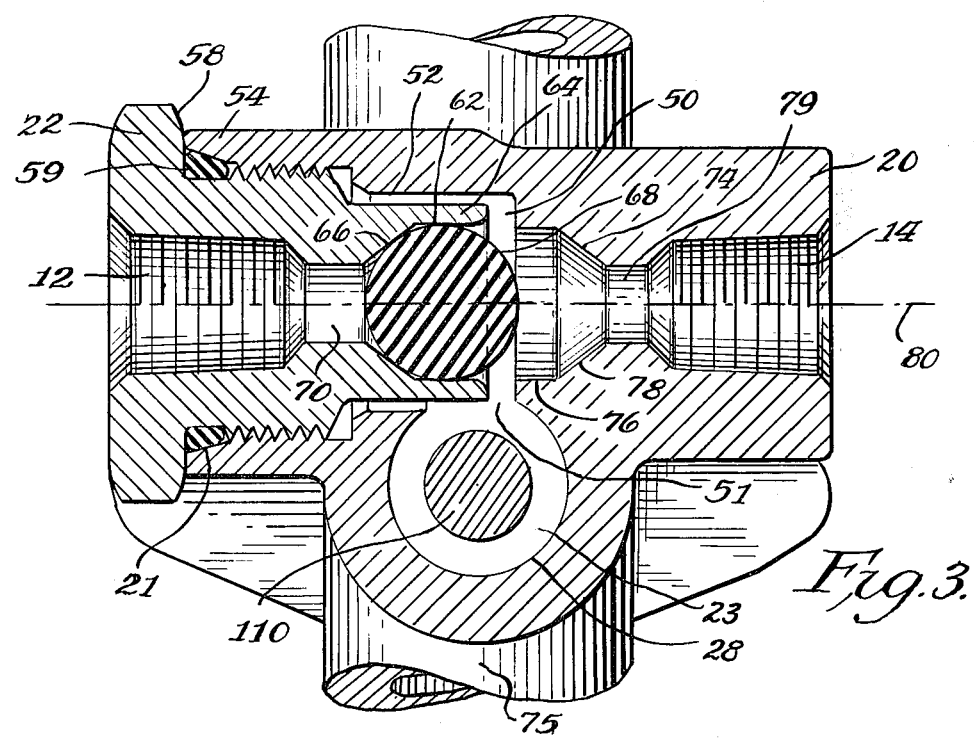

BRAKE APPARATUS INCLUDING CONTROL VALVE WITH INTEGRAL CHECK VALVE

BACKGROUND OF THE INVENTION

1. Field of the Invention

This invention relates to control valves and more particularly to parking brake control valves suitable for use in tractor-trailer combinations.

2. Description of the Prior Art

In recent years, with the advent of improvements in vehicle braking systems, dual supply brake systems have come into use. These systems often employ two "dry" tanks, supplied through check valves from a common "wet" tank; each of the dry tanks constitutes the source of an independent supply line for the vehicle braking system. Heretofore, in some prior art systems a two-way check valve connected to both of the independent supply lines has been employed to provide communication, through a single line connected to the output of the check valve, from the supply lines to a manually operable control valve in the cab of the tractor. This latter valve controls the application of supply pressure to the spring chamber of each of one or more spring brake actuators (of a type such as disclosed in U.S. Pat. No. 3,908,520 issued to J. W. Ma on Sept. 30, 1975) which are employed on the tractor and trailer.

When supply pressure greater than a minimum amplitude is communicated by the control valve to the spring chambers, brake application is controlled by the service brake chamber of these actuators under the influence of service pressure, as modulated by the driver's foot pedal. When, however, the control valve provides ambient or exhaust pressure to the spring chambers, springs contained therein activate the brakes irrespective of the service pressure. Exemplary of known control valves are those disclosed in the following patents: U.S. Pat. No. 3,027,905 issued to H. L. Dobrikin on Apr. 3, 1962; U.S. Pat. No. 3,168,353 issued to C. Horowitz on Feb. 2, 1965; U.S. Pat. No. 3,740,106 issued to C. Horowitz on June 19, 1973; U.S. Pat. No. 3,759,584 issued to B. Klimek on Sept. 18, 1973; U.S. Pat. No. 3,237,995 issued to H. L. Dobrikin on Mar. 1, 1966; U.S. Pat. No. 3,692,366 issued to S. Campanini on Sept. 19, 1972.

The link between the aforementioned two-way check valve and the control valve is a non-duplicated (non-redundant) link. Failure of this single line would effectively defeat the purpose of the dual brake supply arrangement above-described and the prospect of such failure impairs the usefulness of such systems.

OBJECTS OF THE INVENTION

Accordingly, it is an object of this invention to provide improved dual supply braking apparatus.

It is a further object of this invention to provide dual supply braking apparatus with improved failure characteristics.

It is a more specific object of this invention to provide a control valve, having an integral check valve of advantageous design, adapted for use with dual supply braking systems.

Additional objects and features of this invention will become apparent upon reading this specification and claims in view of the attached drawings.

ILLUSTRATIVE EMBODIMENT OF THE INVENTION

In one illustrative embodiment of my invention, a control valve includes a housing of advantageous design, having a central communication channel therein and one or more delivery ports adapted for connection to one or more spring brake actuators. The valve includes apparatus for selectively providing communication between the delivery port(s) and the central channel or an exhaust port. Integrally included in the control valve, within its housing, is check valve apparatus adapted for individual connection to each of a plurality of supply sources. The check valve apparatus is in communication with the central communication channel in the housing.

BRIEF DESCRIPTION OF THE DRAWINGS

For a more specific understanding of my invention, reference shold now be had to the drawings attached hereto, illustrating a preferred embodiment serving as an example of my invention, wherein:

FIG. 1 is a top view of a valve employing principles of my invention.

FIG. 2 is a front view of the valve shown in FIG. 1.

FIG. 3 is a sectional view of the valve shown in FIG. 2 along the line 3—3.

DETAILED DESCRIPTION OF THE DRAWINGS INCLUDING PREFERRED EMBODIMENT

Figure 5:
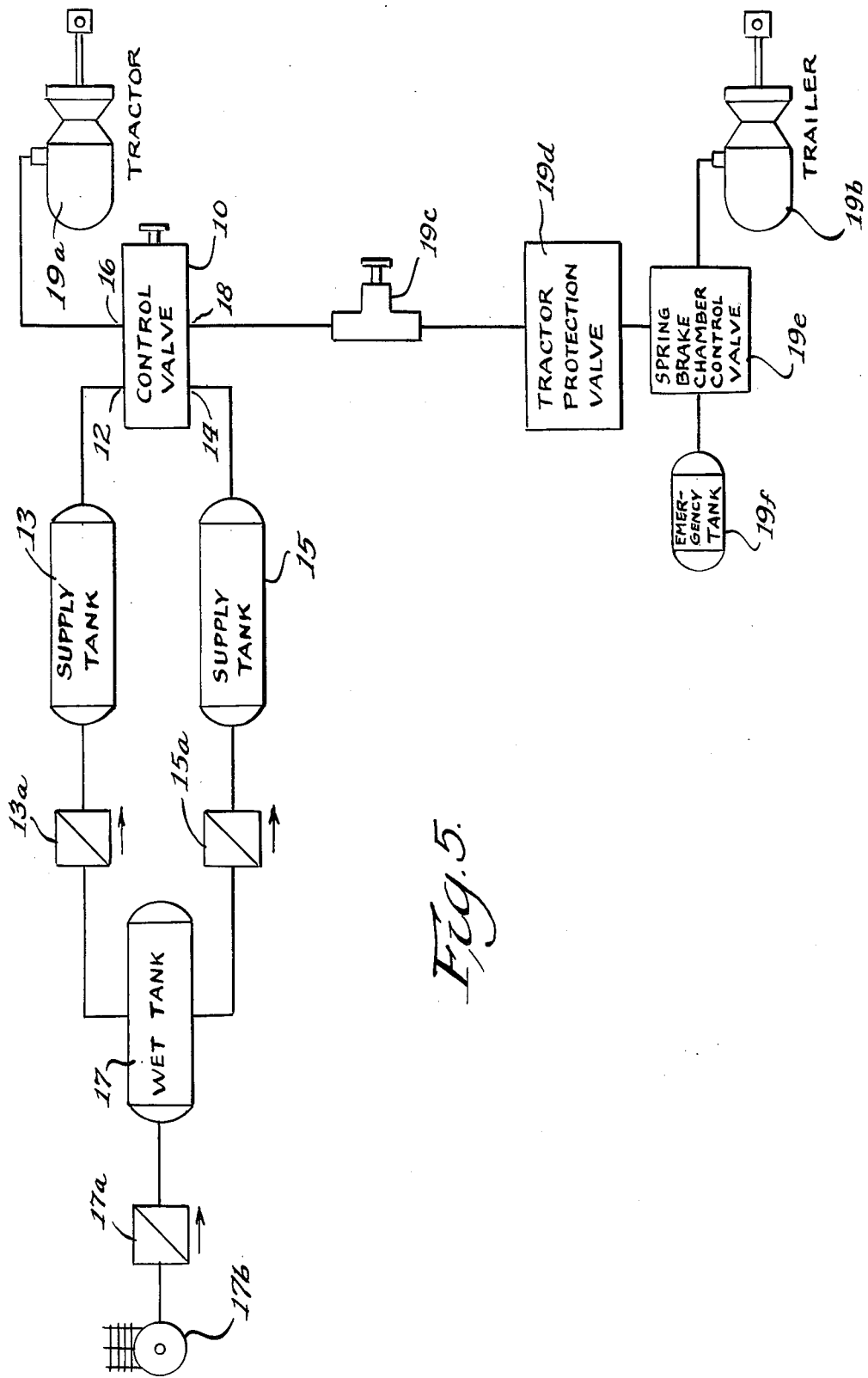
FIG. 5 shows a braking system employing principles of my invention.

Referring to FIGS. 1, 2 and 5, a valve employing principles of my invention is shown generally at 10. The valve includes a supply input port 12 and a supply input port 14. The input port 12 is adapted for connection to a first supply tank 13 and the input port 14 is adapted for connection to a second supply tank 15. The supply tanks 13 and 15 are connected through individual check valves 13a and 15a, (FIG. 5) to a wet tank 17 which is, in turn, coupled through a check valve 17a to a compressor 17b.

The valve 10 also includes a delivery port 16 and a delivery port 18. The delivery port 16 and the delivery port 18 are adapted for coupling to tractor-trailer brake chambers; more specifically, they are adapted for coupling to the respective spring chambers of spring brake actuators of a type such as are described in the aforementioned U.S. Pat. No. 3,908,520 which are known to those skilled in the art to which this invention pertains. In a preferred system (FIG. 5) employing the control valve 10, the port 16 is connected directly to the spring chamber(s) of spring brake actuators(s) 19a on the tractor; the port 18 is connected to the spring chamber(s) of spring brake actuator(s) 19b on the trailer, however, through a known, dash control valve 19c such as disclosed in the aforementioned U.S. Pat. No. 3,168,353, a known tractor protection valve 19d such as disclosed in U.S. Pat. No. 3,109,442 issued to C. Horowitz on Nov. 5, 1963, and a known spring brake chamber control valve 19e such as disclosed in U.S. Pat. No. 3,862,782 issued to C. Horowitz et al., on Jan. 28, 1975; the valve 19e is connected to an emergency pressure supply tank 19f. The disclosures of U.S. Pat. Nos. 3,168,353, 3,109,442, and 3,862,782 are incorporated herein by reference. The dash control valve 19c serves to control the pressurization of the spring chamber(s) of only the spring brake actuator(s) in the trailer and the tractor protection valve 19d prevents any leakage in the trailer from affecting the tractor braking system. The spring brake chamber control valve 19e serves several functions. It suffices here that the valve is responsive to pressure from the tractor protection valve to apply pressure, approximating that in tank 19f or exhaust pressure, to the spring chamber of actuator 19b, as described in the aforementioned U.S. Pat. No. 3,862,782.

Referring to FIGS. 1 through 4, the valve 10 includes a housing 20 having the aforementioned ports 14, 16 and 18 formed integrally therein. The housing 20 also includes a threaded aperture 21 mated with an insert 22 to be described more fully below; the insert 22 includes the aforementioned port 12. In addition, the housing 20 includes a central communication channel 23 open at an end 24 of the housing and extending inwardly thereof. The central communication channel is formed by a plurality of wall portions of the housing: a first cylindrical wall portion 26 (FIG. 4) extends inwardly of the housing from the end 24; a second cylindrical wall portion 28 of slightly lesser diameter integrally abuts the wall portion 26; and a third cylindrical wall portion 30 of still lesser diameter is connected to the portion 28 by a frustoconical portion 31. The channel 23 connects with a cylindrical cavity 32; the cavity 32 extends to the other end 33 of the housing 20. At the conjunction of the portion 30 and the cavity 32, a valve seat surface 34 is formed.

At the end 33 of the housing 20 a cap 38, held in place by bolts 40 which engage tapped holes (not shown) in the housing 20, cooperates with a seal 42 to close the housing; the cap 38 includes an inner surface 39 and an exhaust port 41 formed by an annular rib 39a. The cavity 32 and the inner surface 39 of the end cap form a chamber 43 with which the ports 16 and 18 are in communication by means of communication passages 44 and 46, respectively.

The housing 20 further includes a cavity 50 in communication with the central communication channel 23 through an aperture 51 in the second cylindrical wall portion 28. The cavity 50 is formed by a cylindrical wall 52 including at its distal end an enlarged annular, internally threaded portion 54 forming the aperture 21. The insert 22 threadably engages the portion 54 to the point that an hexagonal end member 58 of the insert engages the distal end of the portion 54. A seal 59 is provided between the insert 22 and the wall 54.

The insert 22 includes at an end opposite the port 12 a seal seating cavity 62 having an annular wall portion 64 and an adjoining concave, frustoconical wall portion 66. The cavity 62 is adapted to receive in sealing engagement a sealing sphere 68 of rubber or other suitable resilient, sealing composition. The cavity 62 is in communication by means of a passage 70 with the aforementioned port 12.

The cavity 50 is in communication with a seal seating cavity 74 formed integrally in the housing 20 by a cylindrical wall portion 76 and an adjoining concave, frustoconical portion 78. The cavity 74 is in communication with the aforementioned port 14 through a passage 79.

It should be noted that the cavities 62 and 74 are arranged such that their respective principal axes are colinear as represented by the center line 80 in FIG. 3. Further, the cavities are positioned such that unimpeded communication is provided between the port 12 and the aperture 51 when the sealing sphere is seated in the cavity 74 and similarly, such communication is provided between port 14 and the aperture 51 when the sphere is seated in cavity 62. In addition, when the sphere is intermediate the cavities 62 and 74, both ports 12 and 14 are in communication with the aperture 51 and thus the central channel 23. However, the wall 64 extends sufficiently inwardly of the housing to provide guidance for the sphere to maintain it in position for movement between the seating cavities. The cavities 62 and 74 are displaced substantially equally from a plane represented by a line 75 in FIG. 3 perpendicular to the axis 80 and including the principal axis 81 of the channel 23.

It should be noted that the axis 80 of the seal seating cavities 62 and 74 (and of the ports 12 and 14 in the illustrative embodiment) is in a plane perpendicular to the plane 75 including the axis 81 and an axis 82 common to the ports 16 and 18. Moreover, the axis 80 is displaced vertically (as seen in FIG. 2) from the axis 81 of the central channel 23 sufficiently that the aperture or passage 51 formed by the intersection of the channel 23 with the cavity 50 is of appropriate dimension for providing unimpeding communication between the cavity 50 and the channel 23. The axis 81 is perpendicular to the axis 82. This arrangement of axes promotes structural integrity and economy of structural material used to form the valve and minimizes interferences between coupling elements used to connect supply and delivery lines (FIG. 5) to the valve.

A shaft 90 (FIG. 4) is mounted for reciprocal motion within the central channel 23. Connected at one end of the shaft 90 is a handle 92 which is connected to the shaft 90 by means of a pin 94 which passes through holes 96 in the handle and through a drill 98 in the shaft. Adjacent the handle the shaft includes a portion 100 slidably engaging the wall portion 26; the portion 100 is connected to a shaft portion 102 of lesser diameter which portion is connected to a shaft portion 104 slidably engaging the wall portion 26. A seal receiving portion 105 adjoins the portion 104 and receives a seal 106. Adjacent the seal receiving portion 105 is a shaft portion 108 which also slidably engages the wall portion 26. The portions 104 and 106 of the shaft 90 serve to retain the seal 106 in its position and together with the portion 100 cooperate with the wall portion 26 of the housing 20 to provide guidance for reciprocal motion of the shaft 90.

Adjoining the shaft portion 108 is a portion or section 110 of substantially lesser diameter. This portion extends toward the end 33 of the housing; it includes, disposed along its length, (just beyond the valve seat surface 34 as viewed in FIG. 4) an annular rib 112 and at its distal end threads 114. Valve members 120 and 122 are mounted on the shaft 90 and retained thereon by means of a nut 124 engaging the threads 114 and a washer 126. The valve member 120 cooperates with the aforementioned rib 112 to retain an annular sealing member 130 adapted to engage the valve seat 34. The valve members 120 and 122 cooperate to retain an annular sealing member 134 which is adapted to engage a valve seat 39b formed in the surface 39 of the cap 38 about the port 41. A compression spring 140 engages the valve member 122 and surrounds the annular rib 39a forming the port 41; the spring urges the shaft 90 and connected elements toward engagement of the sealing member 130 with the seat 34.

Figure 4:
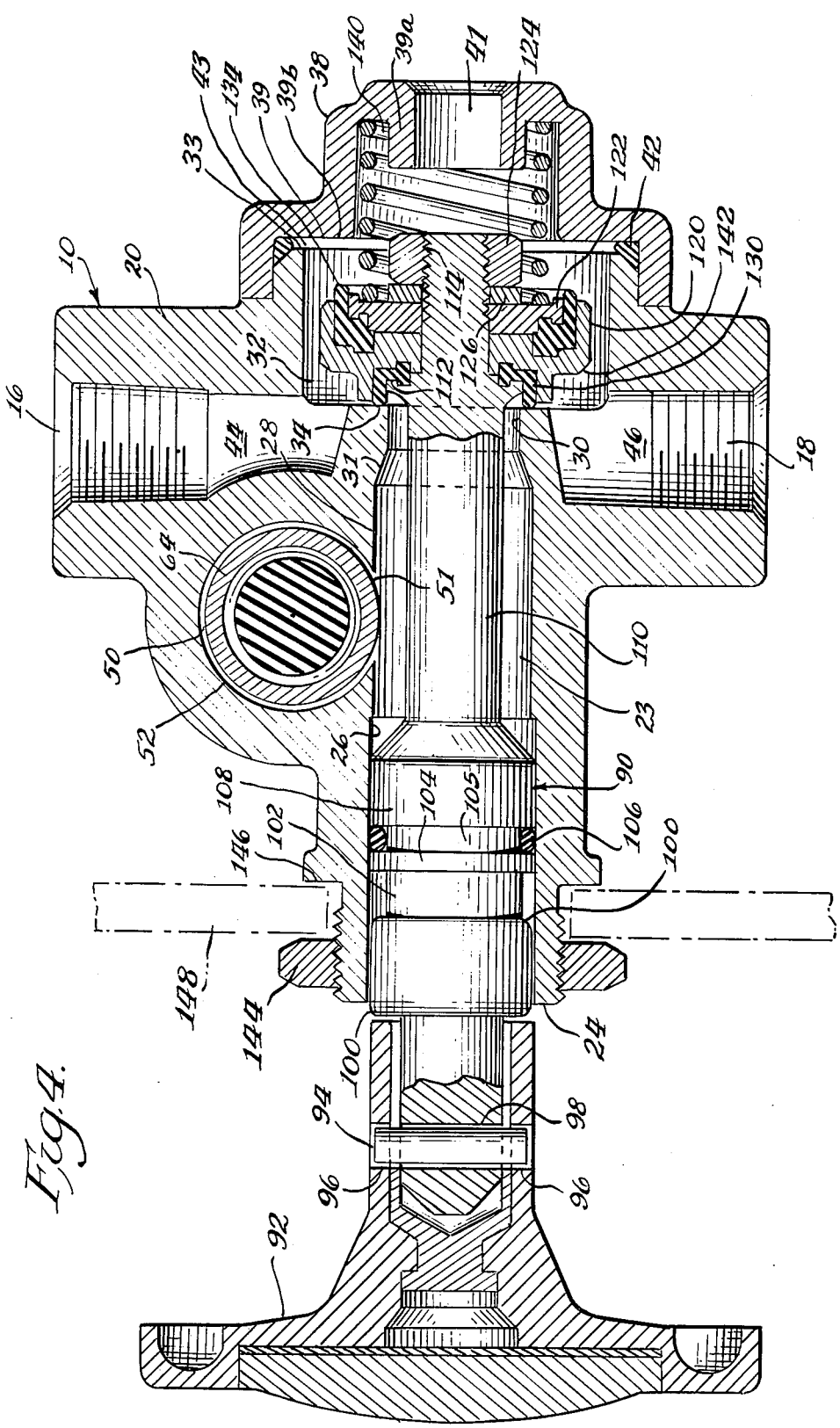
FIG. 4 is a sectional view of the valve shown in FIG. 1 along the line 4—4.

The housing 20 adjoining the end 24 is threaded to receive a nut 144 which is adapted to cooperate with an annular rib 146 disposed along the housing to mount the valve on a structural member 148 (FIG. 4).

In operation the valve 10 is connected as above described to first and second supply sources (tanks 13 and 15). Equal supply pressure at both input ports causes the sphere 68 to assume a position intermediate the seal seating cavities 62 and 74; supply pressure is communicated to the central communication channel 23. As long as the shaft 90 and attached members are in the position shown in FIG. 4, the pressure from the respective sources is prevented from reaching the delivery ports 16 and 18; more specifically, the engagement of the sealing member 130 with the seat 34 under the influence of the spring 140 through the valve members 120 and 122 seals the cavity 32 and chamber 43 from communication with the central channel 23.

It should here be noted that due to the limited area of the rib 112 which is exposed to supply pressure and also due to suitable selection of the spring constant for the spring 140, the spring 140 applies sufficient force to the valve members 120 and 122 to maintain the sealing member 130 in sealing contact with the valve seat 34 even when supply pressure is communicated through the aperture 51. In addition, the ports 16 and 18 are in communication by means of the channels 44 and 46, respectively, with the exhaust port 41. As a result, the pressure appearing at ports 16 and 18 is ambient or exhaust pressure. In practical effect, this condition results in the application of brakes, by all spring brake actuators connected to the valve 10, through the aegis of the springs within the respective spring chambers since exhaust pressure is communicated to each such spring chamber.

When sufficient force is manually or otherwise applied to the handle 92 to move the shaft 90 to the point that the sealing member 134 engages the valve seat 39b, supply pressure is communicated to the ports 16 and 18 and communication of those ports and cavity 32 with the exhaust port 41 is terminated. This positioning of the elements of the valve 10 is maintained after force on the handle 92 is removed if sufficient force to overcome the force of the compression spring 140 is generated on a surface 142 (comprising pressure active surfaces of valve member 120, seal 130 and rib 112) by the pressure communicated through the central channel 23 to the cavity 32 and the ports 16 and 18. Such force is so generated if the pressure in the cavity 32 is greater than a predetermined minimum pressure which, in the preferred embodiment, approximates one half of normal operating supply pressure.

In practical effect, positioning of the valve elements as described above, results in preventing the application of braking force through the aegis of the springs within respective spring chambers of actuators connected to the valve 10. However, if the pressure communicated to cavity 32 through the central channel 23 is less than the predetermined minimum or becomes less than the minimum, the spring 140 forces the shaft 90 and attached elements to the position shown in FIG. 4. As a result, exhaust pressure is supplied to the spring chambers and spring induced braking is effected. The shaft 90 may also be withdrawn to the position shown in FIG. 4 by exerting appropriate manual force on the handle 92.

It should be noted that if either of the supply sources fails, the valve 10 is maintained operative. More specifically, assuming for illustrative purposes that the supply source connected to port 12 fails, the pressure applied through port 14 forces the sealing sphere 68 into sealing engagement with seal seating cavity 62 as shown in FIG. 3. As a result, supply pressure is communicated from port 14 to aperture 51 and the operation of the valve is as described. In the event that the source of pressure connected to port 14 fails, the sealing sphere 68 is forced by pressure appearing at port 12 to a sealing position in cavity 74, and again the operation of the valve is as otherwise described.

The above description of my invention has been presented in terms of an illustrative embodiment thereof. It is not my intention, however, to limit my invention to that illustrative embodiment; many alternative embodiments of the principles of my invention will become apparent to those skilled in the art to which this invention pertains upon reading this specification. Therefore, it is my intention to encompass within the breadth of my invention all those embodiments within the true spirit and scope of the following claims.

What is claimed is:

1. Apparatus adapted for use with first and second sources of pneumatic pressure and first and second spring brake actuators, comprising:
    a housing, having a longitudinal axis, including a first port adapted for connection to such a first actuator, a second port, an exhaust port, and channel means communicating with said first and second ports and said exhaust port and including a portion axially aligned with said longitudinal axis and displaced longitudinally from said first port;
    valve means in said housing, adapted for connection to each of such sources, for communicating pressure from such sources to said channel means while inhibiting communication between such sources, said valve means communicating with said portion of said channel means;
    means at least partially within said channel means for selectively terminating communication between said valve means and said first and second ports and between said exhaust port and said first and second ports;
    a dash control valve having an input port and an output port, said input port being connected to said second port; and
    a tractor protection valve connected to said output port of said dash control valve and including a delivery port adapted for pneumatic coupling to such a second spring brake actuator.

2. Pneumatic apparatus adapted for use in a tractor-trailer braking system with first and second spring brake actuators and first and second pressure sources, said apparatus comprising:
    a first control valve adapted for coupling to each of such pressure sources and to a first of such spring brake actuators, said first control valve including means for selectively providing exhaust pressure or pressure from such pressure sources at least partially in response to external force applied to said control valve and to pressure supplied by such pressure sources, said first control valve inhibiting communication between such pressure sources;
    a second control valve connected to said first control valve, including an output port, said second control valve including means for selectively providing communication between said first control valve and said output port of said second control valve, at least partially in response to external force applied thereto and to pressure supplied by said first control valve; and means connected to said output port of said second control valve, for supplying pressure to such second spring brake actuator at least partially in response to pressure at said output port of said second control valve.

3. Apparatus as in claim 2 wherein said means for supplying pressure to such second spring brake actuator comprises a tractor protection valve pneumatically coupled to said output port of said second control valve for supplying pressure for controlling such spring brake actuator.

4. Apparatus as in claim 2 wherein said means for supplying pressure to such second spring brake actuator comprises a spring brake chamber control valve pneumatically coupled to said output port of said second control valve for supplying pressure to control such spring brake actuator.

5. Apparatus as in claim 2 wherein said means for supplying pressure to such second spring brake actuator comprises:

a tractor protection valve including an output port, and an input port connected to said output port of said second control valve;

a spring brake chamber control valve including a tank port, an output port adapted for coupling to such a second spring brake actuator, and an input port connected to said output port of said tractor protection valve; and a tank connected to said tank port.

* * * * *